(12) United States Patent
Lianza et al.

(10) Patent No.: US 7,372,571 B2
(45) Date of Patent: May 13, 2008

(54) COLOR SENSING APPARATUS

(75) Inventors: Thomas A. Lianza, Bedford, NH (US); Richard A. Federico, Reading, MA (US); Carl D. Lutz, Auburn, NH (US)

(73) Assignee: GretegMacbeth, LLC, New Windsor, NY (US)

( * ) Notice: Subject to any disclaimer, the term of this patent is extended or adjusted under 35 U.S.C. 154(b) by 210 days.

(21) Appl. No.: 11/240,917

(22) Filed: Sep. 30, 2005

(65) Prior Publication Data

US 2006/0082776 A1    Apr. 20, 2006

Related U.S. Application Data

(60) Provisional application No. 60/653,048, filed on Feb. 15, 2005, provisional application No. 60/614,257, filed on Sep. 30, 2004.

(51) Int. Cl.
*G01J 3/51* (2006.01)

(52) U.S. Cl. ............... 356/419; 250/214 B; 348/191

(58) Field of Classification Search ............ 356/405, 356/419; 348/191; 250/214 AL, 214 B
See application file for complete search history.

(56) References Cited

U.S. PATENT DOCUMENTS

| | | | |
|---|---|---|---|
| 3,675,984 A | 7/1972 | Vulmiere et al. | |
| 4,632,559 A | 12/1986 | Brunsting | |
| 4,707,138 A | 11/1987 | Coatney | |
| 5,459,678 A * | 10/1995 | Feasey | 358/518 |
| 5,892,585 A | 4/1999 | Lianza et al. | |
| 6,163,377 A * | 12/2000 | Boles et al. | 356/402 |
| 6,459,485 B1 | 10/2002 | Tsurutani | |
| 6,505,775 B1 | 1/2003 | Gu et al. | |
| 2002/0126286 A1 | 9/2002 | Melnyk et al. | |
| 2002/0159065 A1 | 10/2002 | Berstis | |
| 2004/0075032 A1 | 4/2004 | Lutz | |
| 2004/0080749 A1 | 4/2004 | Lutz et al. | |
| 2004/0104883 A1 | 6/2004 | Drader | |
| 2004/0114144 A1 | 6/2004 | Lutz et al. | |

FOREIGN PATENT DOCUMENTS

| | | |
|---|---|---|
| EP | 0495569 | 7/1992 |
| EP | 1 233 610 | 8/2002 |

OTHER PUBLICATIONS

European Search Report dated Jan. 19, 2006.
Partial European Search Report dated Mar. 13, 2007.
European Search Report dated Jul. 10, 2007.
European Search Report dated Jun. 20, 2006.

* cited by examiner

*Primary Examiner*—F. L. Evans
(74) *Attorney, Agent, or Firm*—McCarter & English, LLP

(57) ABSTRACT

A colorimeter method and apparatus is described. The colorimeter includes a plurality of sensors/filter systems with non overlapping spectral responses, adequate for providing data capable of translation into standard coordinates system such as, CIE XYZ, CIE L*a*b*, or CIE Luv, as well as non-standard operable coordinate systems. The field of view of the colorimeter is chosen to closely track the response of the human eye using an optical path configured to select and limit the field of view in a manner that is insensitive to placement of the colorimeter on the source image. The optical path from the source image to the sensor is configured to select preferred light rays while rejecting undesirable light rays to maximize the signal/noise ratio. A rearward facing sensor channel is included to simultaneously measure ambient light impinging on the source image and feedback means to provide status and/or change of information.

23 Claims, 10 Drawing Sheets

COLOR SENSING APPARATUS

CROSS-REFERENCE TO RELATED APPLICATION(S)

The present application claims the benefit of co-pending, commonly assigned provisional patent applications entitled "Colorimeter with Optical Geometry and Assembly Means to Improve Signal to Noise Ratio" which was filed on Sep. 30, 2004 and assigned Ser. No. 60/614,257 and "Improved Colorimetry by Proper Handling of Ambient Light" which was filed on Feb. 15, 2005 and assigned Ser. No. 60/653,048. The entire contents of the foregoing provisional patent applications are hereby incorporated herein by reference.

BACKGROUND

1. Technical Field

The present disclosure relates to calorimeters, and more particularly, to a colorimeter with optical geometry and assembly that provides high a signal-to-noise ratio (SNR) and/or properly handles ambient light.

2. Background Art

Colorimeters are accurate devices for measuring the spectral content of light emitted either directly or indirectly from a given source. Standards bodies such as the Video Electronics Standards Association (VESA) have been a driving force behind the development of colorimeter performance. The VESA 1.0 standard, for example, is primarily directed to specifying measurement of contrast ratio, and is limited to a no greater than +/−2 degree viewing angle from the source to the sensor.

However, typical devices being measured, such as computer displays, are actually viewed from much greater angles than specified in the standards. To further exacerbate this situation, the degradation of spectral parameters that occurs with increased viewing angle, does not occur equally for all colors. Such incompatibilities have yet to be resolved or otherwise addressed. In addition, early devices developed under the standards were relatively costly. Such devices typically employ highly accurate measurement optics. Apertures have frequently been used in conjunction with lenses or other precision optical elements. Typical colorimeter configurations include a light sensing diode, and an integral lens that directs light to the sensor area.

More recent developments have produced designs resulting in low cost calorimeters with performance characteristics approaching or exceeding professional quality required by the standards. Such newer designs generally employ basic aperture geometry, and either non-overlapping or overlapping spectral ranges/filters. One such design uses a unique aperture plate that has oblong holes, and is spaced between the target surface and the filter/sensor set. The resulting field of view is about +−15 degrees or more on each axis.

However, such a design does not correspond to the field of view of the human eye. Rather, it is about four times too large. Also, the position of the aperture plate is spaced from the target surface by a mounting distance that is typically defined by one to four relatively large suction cups (i.e., one at each corner of the colorimeter housing). Such designs generally cause variations in the mounting distance due to leaking-based relaxation of the suction cups.

This variation, in conjunction with a fixed-distance between the aperture plate and the sensor, causes the field of view to vary as well, and adversely impacts the accuracy of color measurements taken.

In addition, colorimeter designs generally require alignment of the sensor to one or more optical paths. This alignment is typically provided by a secondary reference surface on the sensor diode. However, this sensor reference does not assure accurate alignment of the sensor in the plane parallel to the measured surface, and there is no means for locating the center of the senor lens to the center of the optical path. Such limitations contribute to undesirable decay of the SNR, as well as to inadequate color measurement accuracy.

While prior art colorimeters concentrated on measurement of what the sensor "sees", effects on perception resulting from ambient light impinging upon the source has eluded the existing colorimeter art. Colorimeter performance can be greatly degraded by ambient light effects of: 1) image perception of the human eye in the presence of varying ambient conditions, 2) ambient light reflected from the display screen integrated with the display screen image source, 3) flare, and other factors.

A metaphoric example of the types of perceived changes in "viewed monitor" systems in the presence of changing ambient light conditions follows below. When viewing automotive headlights in the daylight, they appear yellowish and dim. However, when viewing the headlights at night, they appear bright and white or blue white. This example highlights how important it is to calibrate for ambient light conditions in order to get quality results in a monitoring/viewing/measurement system.

In general, viewing a screen in dim ambient conditions leads to a perception of less color. If this in turn leads to arbitrary adjustment of the brightness control (when available such as with analog displays), system calibration can be severely hampered.

An attribute of a good calorimeter is the ability to anticipate the effects of ambient light on the source as perceived by the viewer and correct for such effects. Brightness controls on displays are notoriously non-linear. Uncalled for adjustment of brightness by the user can introduce severe degradation of contrast, linearity and perceived anomalies. Further image contrast and the ability to discern detail at different levels of image luminosity can be adversely affected by ambient illuminance of the area immediately adjacent to the image.

In one instance known to the inventors, a product distributor, LaCie, adapts only for intensity of ambient light, ignoring calorimetric content. However this solution also requires that the sensor be reversed to make the ambient reading. While it has been recognized that ambient light presents many problems and challenges to colorimeter measurement quality, to date the most sophisticated approaches are limited to taking a reading of the ambient at a point, and then depending on that measurement of ambient light for all ensuing ambient light compensation. Typically this is accomplished by turning the calorimeter away from the source image to take a reading of the ambient light. In some instances a diffuser is placed on the colorimeter to improve the specific and single measurement.

Previously disclosed embodiments of a calorimeter by the assignee of the present application measured ambient light by removing the calorimeter body from the image source screen, placing a diffuser on the viewing surface of the colorimeter, and orienting the combination away from the screen to get a reading estimate of the ambient light.

Nonlinearities of displays, complexity of color measurement, response of the human eye, effects of viewing room ambient conditions, measurement degradation due to extraneous other factors and the interactions between the factors make measurement and compensation challenging at the least. It is desired to maximize the S/N (signal/noise ratio) by controlling the ambient light effects within the system such as: flare, reflected light, extraneous light rays impinging on the sensor and numerous other sources of light impinging on the sensor that are not primary source generated rays. Therefore, a colorimeter is desired that takes into account the effects of ambient light impinging on the source image (LCD, CRT screen, etc.).

Further, there is a desire for making the calorimeter measurements agree more with the ambient light that impinges on the source image and reading the ambient light on an ongoing basis to make important corrections in a varying ambient light environment. It is further recognized that it would be a desirable feature of a colorimeter to be able to alert the user to real time changes in ambient viewing light that are deemed sufficient to effect the perceived attributes of the image.

In sum, an improved colorimeter design is desired having optimal or otherwise increased SNR, that has a field of view that corresponds to that of the human eye and that has the ability to continually sense ambient light impinging on the source image. In a more general sense, an improved colorimeter design is desired for accurately measuring color from the likes of displays, CRTs, LCDs, and printed or pictorial materials.

SUMMARY OF THE DISCLOSURE

The present disclosure provides advantageous to maximizing the signal-to-noise ratio of a colorimeter sensing light emitted from a target surface by matching the colorimeter's field of view to that of the human eye for devices that measure target surfaces (e.g., displays, CRT's, LCD's, printed, and pictorial materials), commonly viewed by humans. Further, the present disclosure provides advantageous to accounting for the effects on perception resulting from ambient light impinging upon the target surface.

Accordingly, in an exemplary embodiment of the present disclosure, a color sensing device for sensing light emitting from a target surface includes a chamber block having at least three overlapping spectral light passages extending through the chamber block configured to select a preferred field of view between the target surface and a corresponding sensor adapted to detect light from the target surface. Each light passage is configured having an entry orifice, exit orifice and an intermediate chamber. The entry orifice faces the target surface and is defined with an entry wall defining an entrance for emitted light from the target surface into the light passage. The exit orifice faces the sensor and is defined with an exit wall defining an exit for the emitted light from the light passage. The chamber intermediate the entry and exits walls is defined by a chamber wall having a diameter larger than a diameter of the entry and exit walls.

In another exemplary embodiment of the present disclosure, a color sensing device for sensing light emitting from a target surface includes three or more light sensors. Each sensor is configured to detect light from the target surface. The device includes a sensor locating element having three or more light passages and corresponding alignment features. Each alignment feature is adapted to receive a locating feature of a corresponding sensor, thereby aligning each sensor with a corresponding light passage. The device also includes a chamber block operatively coupled in alignment with the sensor locating element. The chamber block has three or more filter cavities and corresponding light passages. Each light passage is in alignment with a corresponding light passage of the sensor locating element. Each light passage is configured having an entry orifice, exit orifice and an intermediate chamber. The entry orifice faces the target surface and is defined with an entry wall defining an entrance for emitted light from the target surface into the light passage. The exit orifice faces the sensor and is defined with an exit wall defining an exit for the emitted light from the light passage. The chamber intermediate the entry and exits walls is defined by a chamber wall having a diameter larger than a diameter of the entry and exit walls. The device also includes three or more distinct light filter stacks including one or more filter elements. Each filter stack is placed in a corresponding one of the filter cavities, thereby providing three or more overlapping spectrally selective channels, with each spectrally selective channel designed to provide a pre-defined field of view between the target surface and a corresponding one of the light sensors.

In another exemplary embodiment of the present disclosure, a color sensing device for sensing light emitting from a target surface includes a first housing; three or more light sensors disposed with the first housing and facing the target surface; a chamber block having at least three spectral light passages extending through the chamber block configured to select a preferred field of view between the target surface and a corresponding light sensor adapted to detect light from the target surface; and an ambient light sensor disposed at one of with and within the first housing facing ambient light impinging the target surface without the need to reorient the first housing relative to the target surface. The ambient sensor continuously reads the impinging light while the three or more light sensors simultaneously read the light attributes emanating from the target surface.

In another exemplary embodiment of the present disclosure, a method for simultaneously measuring ambient light illumination impinging on a target surface and attributes of the luminance emanating from the target surface is disclosed. The method includes reading luminance from the target surface using three or more light sensors disposed with a first housing and facing the target surface, each sensor configured with a lens and adapted to detect light from the target surface; and reading ambient light impinging on the target surface using an ambient light sensor disposed at one of with and within the first housing facing ambient light impinging the target surface without the need to reorient the first housing relative to the target surface. The ambient sensor continuously reads the impinging light while the three or more light sensors simultaneously read the light attributes emanating from the target surface.

Additional advantageous features and functions associated with the disclosed apparatus and method will be apparent from the detailed description which follows, particularly when viewed in conjunction with the appended figures.

BRIEF DESCRIPTION OF THE DRAWINGS

So that those of ordinary skill in the art to which the subject disclosure pertains will more readily understand how to make and use the systems and methods described herein, aspects of preferred embodiments of the present disclosure will be described in detail with reference to the drawings, wherein.

DETAILED DESCRIPTION OF EXEMPLARY EMBODIMENT(S)

Embodiments of the present invention provide colorimeters capable of measurement of emitted light from sources that are static such as LCD displays, illuminated printed or graphic matter, and/or temporally active such as CRT displays or strobed printed and graphic matter. The assembly and configuration of the device operates to maximize the signal-to-noise ratio (SNR), as well as to provide an optimal field of view that simulates the field of view of the human eye. Geometric elements and features of the device design, in conjunction with the assembly procedure, assure precise alignment of optical elements including sensors, filters, and other elements within the enclosure and optical path.

One particular embodiment of the device is configured with a viewing angle or field of view (FOV) in the range of +/−5 to 7 degrees. This FOV is near optimum for achieving the desired performance for the low cost calorimeter, and effectively matches the human eye field of view. A chamber block element, which can be sized to fit into the existing products, has a number of light passage chambers, the chamber being configured relative to entry and exit orifices of each light passage is positioned, configured and dimensioned to meet the +/−5 to 7 degree requirement to achieve the desired FOV. The chamber block can be molded from a material that minimizes reflectance of the chamber walls, thereby preserving the selected FOV.

In addition, the chamber block is configured with guide pins and a number of filter stack cavities which allow for alignment of the sensors and their respective molded lenses to the center of the optical field. The device components, such as the sensors, filters, printed circuit board (PCB), molded chamber block, housing, and other system elements can be assembled prior to soldering the sensors to the PCB. These self-aligning and pre-solder assembly qualities enable a significantly improved SNR relative to conventional devices e.g., four to five times higher).

Crushable ribs can be employed during assembly to provide a compliance that both preserves filter integrity, while simultaneously providing adequate clamping force to hold system elements in place. The device is not affected by mounting compliance or other variable factors. The design enables different filter sets to provide overlapping or non-overlapping spectrally selective channels. In operation, the colorimeter characterizes the measured target surface as the human eye would see it, including both the human eye's color response and field of view. In the case of a display screen, the device can be configured to detect the type of display. Thus, a low cost high accuracy calorimeter is provided.

Figure 1:
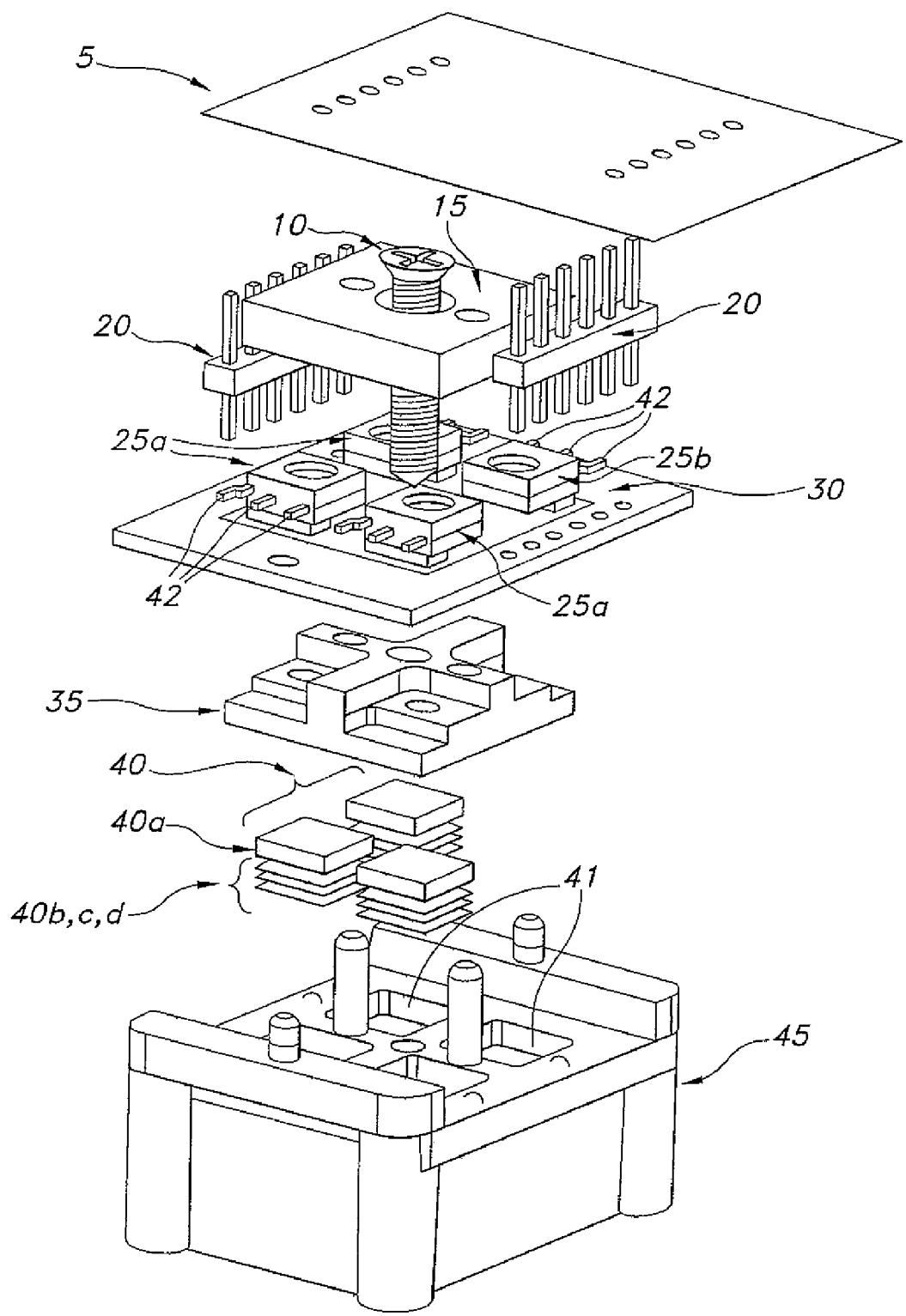
FIG. 1 is an exploded view of a HTF light tunnel sensor of a target colorimeter configured with a tube block in accordance with the prior art.

FIG. 1 is an exploded view of a prior art calorimeter assembly configured in accordance with one disclosed in U.S. Patent Publication No. 2004-0114144, entitled "Colorimeter with High SNR", the contents of which are incorporated herein in their entirety. As can be seen, the assembly includes a sensor shield 5, a clamping screw 10, a clamping block 15, pin headers 20 and a corresponding PCB assembly 30, a number of sensors 25a-b, a sensor locating element 35, a number of filter stacks 40, and a tube block 45. Other components and features, such as a dust cover, cabling, and calorimeter circuitry, may also be included in the design as will be apparent in light of this disclosure.

The assembly procedure will be apparent from FIG. 1. Three filter stacks 40, each of which includes a glass layer 40a and three filter layers 40b-d, are placed in respective cavities of the tube block 45. Each cavity has a centrally located light passage that travels through the tube block 45 to allow intake of light from a target surface. The sensor locating element 35 is placed onto the tube block 45 via center guide pins to secure the filter stacks 40 in their cavities. The lead frame PCB assembly 30 is placed into position on the tube block 45 via a set of end guide pins. Three light-to-frequency sensors 25a and a light-to-voltage sensor 25b are placed in their respective positions, so that the lens of each sensor 25 is received into an lens alignment hole of the sensor locating element 35, thereby enabling filtered light to be received via the corresponding light passage. The clamping block 15 is placed over the sensors 25 via the guide pins of the tube block 45. The clamping screw 10 is torqued to secure the assembly. The sensor leads can then be soldered to the PCB assembly 30. Note that functional testing of the device can be performed before and/or after the soldering (assuming the unsoldered leads are in proper electrical contact). The sensor shield 5 can be installed over and/or around the clamping block 15 to prevent extraneous light from entering the back of the device, which reduces measurement accuracy. Also, a removable dust cover 5 can be coupled with the target surface side of the tube block 45 to protect the device until its use.

These particular sensor features are part of the manufacturer's design, and are accommodated by the designated features of the sensor locating element 35. In one particular embodiment, for example, sensors 25a are each a Texas Instruments TSL235 light-to-frequency converter, and sensor 25b is a Texas Instruments TSL250R light-to-voltage converter. It will be appreciated in light of this disclosure that other sensors types, shapes, and configurations can be used here as well.

Note that the clamping block 15 and the sensor locating element 35 can be fabricated in a similar fashion as the tube block 45 (e.g., a molded material having a low reflectance, such as black ABS/PC plastic). Further note that the overall assembly can be mated to a primary PCB which contains all ancillary circuits to accomplish calorimeter functions, such as spectral measurement, spectral translations to standard coordinate systems, integration of samples, determination of display type, timing, and other required functionality.

Figure 2:
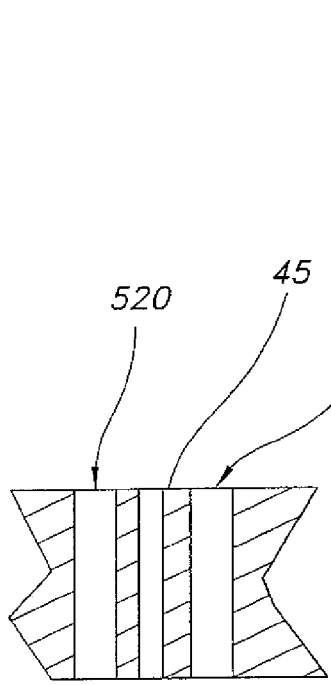
FIG. 2 is a partial cross section view of the prior art tube block of FIG. 1.

FIG. 2 is a cross sectional view of the tube block assembly 45 of FIG. 1 illustrating a pair of light passages 520 extending therethrough having a cylindrical or tube shape and having substantially the same diameter along a length thereof.

The inventors' prior filing in U.S. Patent Publication No. 2004-0114144 describes a complete colorimeter with tile physical body geometry optimized for maximum SNR including an optical tube body (tube block member 45 of cited application), and further includes other mechanical, electronic and software elements as disclosed in U.S. Pat. No. 5,892,585. Among the geometric features cited in the preceding was the statement: "The molded material for the tubes was filled material that minimized the reflectance of the walls of the tube, preserving the proper selection of the field of view." This was an important feature for maximizing SNR and a significant improvement over prior art. However, further research testing and evaluation has led to the conclusion that there was some residual reflection from the tube walls, which has been corrected by the refinement disclosed herein (e.g., replacing the cylindrical tube with a chamber with recessed walls and other features which may also include use of material with minimum reflectance).

As a further improvement, the inventors redesigned the tube block 45 by removing the walls of each tube, and replacing them with a respective chamber. The chamber was so designed that the entrance and exit orifices of each tube remained intact. This positioning and design of the orifices preserved two advantages of the tube geometry: 1) the ability to optimize for the angular field of view of the instrument, and 2) the rejection and elimination of light rays not traveling in the desired direction that would deteriorate the SNR if not eliminated. Further, the chamber is designed so that the walls of the chamber are oriented to minimize reflectance of extraneous rays from reaching the sensor. The tube block disclosed in the prior application from the inventors included a tube block element (45), consisting of cylindrical tubes from the entry orifice to the sensor of each optical channel of the calorimeter. In the exemplary embodiments disclosed herein, each tube is replaced with a chamber having recessed walls or larger diameter walls than the entry and exit orifices, with one chamber per sensing channel.

It has been found that by replacing the walled tube with remote-walled chambers, or recessed chambers, has further improved the SNR of the instrument by significantly reducing extraneous noise rays. An exemplary embodiment of the new chamber block is desirably molded as a two part chamber block consisting of a member with the chambers and respective front orifices and a member with respective rear orifices which also can be used to aid in the final positioning and alignment of the optical sensors. These two members constitute the chamber block cited herein as a significant improvement over the previously disclosed tube block while preserving all of the other features of the inventors prior art.

Further, in addition to replacement of each tube with a corresponding chamber, baffles may be added to further improve the SNR ratio. The baffles can be disposed either within the chambers or, outside of the chamber (as in proximity to the entrance and exit or both).

Figure 3:
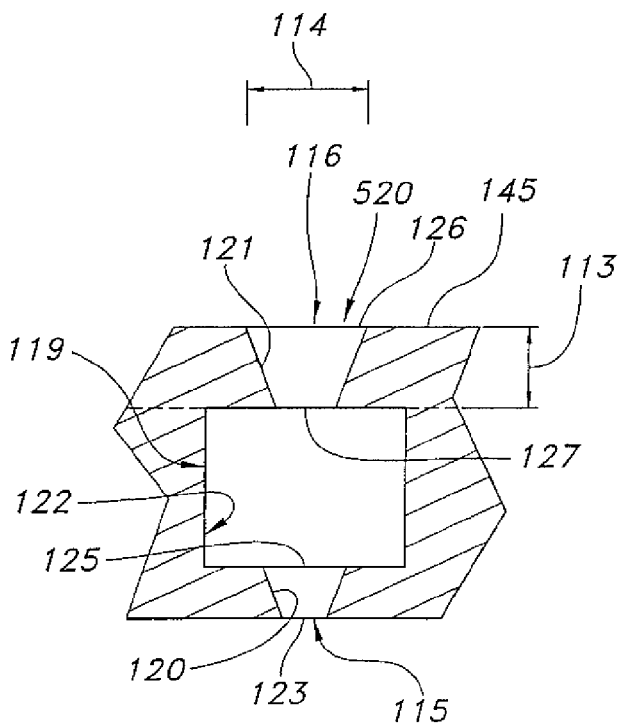
FIG. 3 is a partial cross section view of a chamber block replacing the tube block of FIG. 1, the chamber block illustrating a chamber and corresponding entry and exit orifices in accordance with the present disclosure.

Referring now to FIG. 3, a partial cross section view of a chamber block 145 is illustrated showing a light passage therethrough in accordance with an exemplary embodiment. It should be noted that chamber block 145 may be substituted for the tube block 45 of FIG. 1. It will also be noted that referenced elements 110-119 represent the features of the improved geometry disclosed herein. Other elements referenced as elements 5-41 (with the exception of 110-119) are used to provide a description of the prior invention for which the new material disclosed herein pertains to the disclosed improvement.

The invention disclosed herein represents a collection of geometric parts and certain key features associated with these parts to optimize the field of view (favoring approach to that of the human eye response), SNR ratio, selection of materials and geometry with respect to reflectance, clamping of the assembly without deforming the filters, free floating of the sensors during clamping followed by soldering in place after clamping, providing dust protection and securing parts in place for ease of assembly.

As described above with reference to FIGS. 1 and 2, in conjunction with FIG. 3, clamping block 15 has bump features (not shown) to apply a clamping pressure on the back of the sensor 25. Sensor 25 fits between clamping block 15 and sensor locating element 35. Sensor locating element 35 mates to sensor 25 with semicircular referencing lens alignment feature (not shown) forcing intimated contact with the reference lens alignment feature to establish alignment of the lens with the center of the remainder of the optical path consisting of elements: light passage 520, filter stacks 40, filter stack cavity 41 of chamber block 145, field control orifices 115, 116 of chamber block 145, and a clear dust cover or sensor shield 5. Further, a planar locating reference surface of sensor 25 mates with locating element planar reference surface of sensor locating element 35 to assure planar alignment of the sensor 25 parallel to the target surface or source image (not shown).

As in U.S. Patent Publication No. 2004-0114144, lead frame/PCB assembly 30 positions the collection of optical elements between clamping block 15 and sensor locating element 35. It is so designed that it provides a soldering point for connecting sensor 25 to the system electronics.

Filter stack cavity 41 of chamber block 145 provides a means for accommodating a variety of filter combinations within filter stack 40 to characterize a measurement channel spectrally. Field control entry orifice 115 and exit or 116 of chamber block 145 have an optimally calculated and derived orifice diameter 114 and a length 113 that is determined by the respective orifice diameter 114 and calculations that derive the optimal field of view.

Clamping of the entire assembly, including clamping block 15, sensor(s) 25, sensor locating element 35 and chamber block 145, is accomplished by tightening clamping screw 10 to chamber block 145 and secured by screwing screw 10 into a threaded hole of the chamber block 145.

During this entire assembly process, the sensor 25 is free to float and locate as described in the clamping procedure description above with reference to FIG. 1. Each of the sensors 25 becomes accurately aligned as a result of the design and the clamping action of tightening clamping screw 10. After clamping, the sensor leads 42 are soldered to the lead frame/PCB assembly 30. Dust cover or sensor shield 5 fits over the exposed surface of the colorimeter to block entry of dust and other contaminants.

Electrical tape is used at several locations during fabrication to facilitate assembly. The assembly discussed embodies all of the features of the invention. This assembly in turn mates to the system's primary PCB which contains all ancillary circuits to accomplish: spectral measurement, spectral translations to standard coordinate systems, integration of samples, determination of display type, timing, and other required elements.

Also necessary to the successful operation of the invention are a number of software and firmware routines that the inventors have developed to achieve the objectives of the invention with optimum performance. These software, firmware, and circuit functions are largely described in U.S. Pat. No. 5,892,585 incorporated herein by reference in its entirety.

Referring again to FIG. 3, one exemplary embodiment of the chamber block 145 is illustrated for use with a color sensing device for sensing light emitted from a target surface. Chamber block 145 includes at least three overlapping spectral light passages 520 (only one shown) extending through the chamber block 145 configured to select a preferred field of view between the target surface and a corresponding sensor 25 adapted to detect light from the target surface. Each light passage 520 includes entry orifice 115 facing the target surface (not shown). The entry orifice 115 is defined with an entry wall 120 defining an entrance for emitted light from the target surface into the light passage 520. The exit orifice 116 facing a respective sensor 25 is defined with an exit wall 121 defining an exit for the emitted light from the light passage 520. The chamber 119 is disposed intermediate the entry and exits walls 120, 121, respectively. The chamber 19 is defined by a chamber wall 122 having a diameter larger than a diameter of either of the entry and exit walls 120, 121, respectively. FIG. 3 illustrates that both the entry and exit walls 120, 121 each form a frustoconical orifice. However, it is contemplated that one or the other may be cylindrical, or both be cylindrical, having a substantially constant diameter along a length thereof.

In an exemplary embodiment, as shown, the entry orifice 115 is defined with an entry opening 123 to the chamber block 145 having a diameter smaller than a first opening 125 to the chamber 119. Further, the exit orifice 116 is defined with an exit opening 126 to the chamber block 145 having a diameter larger than a second opening 127 to the chamber 119. The first and second openings 125, 127 defining opposite openings of the chamber 119 connected to the entry and exit walls, respectively.

Figure 4:
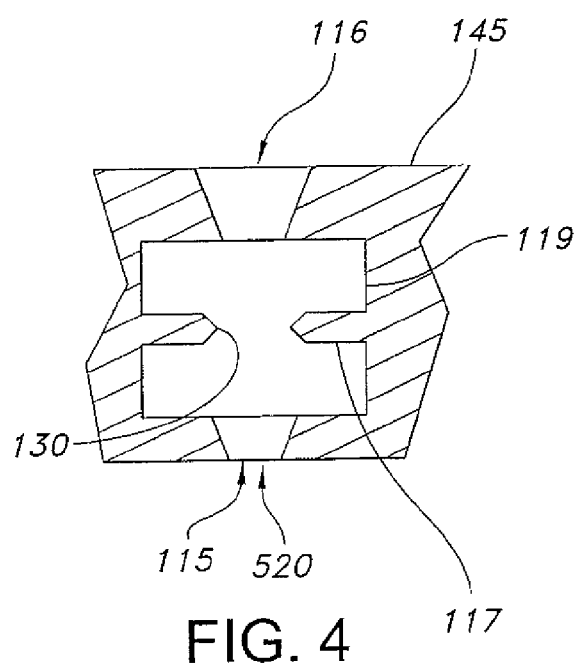
FIG. 4 is another cross section view of the chamber block of FIG. 3 including an internal baffle disposed in the chamber according to the present disclosure.
Figure 5:
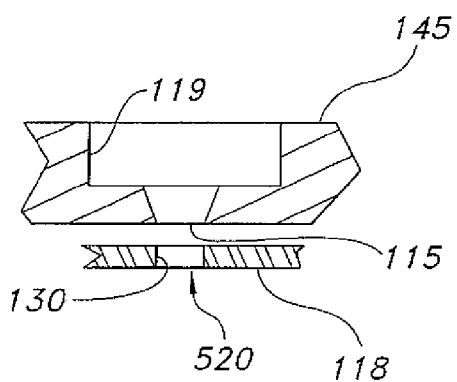
FIG. 5 is another cross section view of the chamber block of FIG. 3 including an external baffle disposed outside the chamber block and proximate the entry orifice according to the present disclosure.

As best seen with reference to FIG. 5, the chamber block 145 may be a two part separable chamber block 145. More specifically, chamber block 145 is desirably molded as a two part chamber block comprising two separable members to aid in the final positioning and alignment of the optical sensors. Further, with reference to FIGS. 4 and 5, the chamber block may include a baffle 117, 118 having an aperture 130 aligned with the light passage 520 of the block 145. The baffle 117, 118 may be disposed inside the chamber 119 (FIG. 4) or outside the chamber 119 in proximity of the entry or exit orifices 115, 116, respectively, (FIG. 5) to eliminate or minimize extraneous light rays that might reach the sensor 25 and degrade the signal-to-noise ratio.

FIG. 4 depicts the baffle 117 disposed inside the chamber 119. Further, the corresponding aperture thereof is defined by a by countersink on opposite surfaces defining the baffle 117. FIG. 5 depicts the baffle disposed outside the block 145 and spaced from a respective corresponding entry orifice 115.

The principles of the present disclosure discussed above may be employed by any colorimeter or similar sensing device. One such calorimeter design is described in detail in U.S. Pat. No. 5,892,585, which is herein incorporated by reference in its entirety. Note that a number of software and firmware routines can be used to achieve optimum calorimeter performance. Example software, firmware, and circuit functions are also described in the U.S. Pat. No. 5,892,585. Generally, a calorimeter is designed to simulate the color response of a human eye. An RGB result is calculated based on the colorimeter channel outputs (e.g., X, Y, and Z).

In addition, mounting techniques can be employed to further improve the device performance, such as the mounting techniques described in U.S. Patent Publication No. 2004-0075032, titled "Sensor with Suction Cup Array Mount", and in U.S. Patent Publication No. 2004-0080749, titled "Colorimeter with Single Cable Low Impact Mounting System".

As discussed above in the background, it has been recognized that ambient light presents many problems and challenges to calorimeter measurement quality. To date the most sophisticated approaches are limited to taking a reading of the ambient at a point and then depending on that measurement for all ensuing ambient light compensation. Typically this is accomplished by turning the colorimeter away from the source image to take a reading of the ambient light. In some instances a diffuser is placed of the colorimeter to improve the specific and single measurement.

The applicants recognize the need to maximize the signal-to-noise ratio of any colorimeter and address matching the colorimeter's field of view to that of the human eye for devices that measure targets (displays, CRT's, LCD's, printed, and pictorial materials, for example, but not limited thereto) commonly viewed by humans, and further the need to compensate for the effects of ambient light reaching the sensor. Still further, the applicants recognize that if one could compensate for the perception of the human eye in the presence of ambient light impinging on the image source that a significant step forward in the state of colorimetry would be achieved. This area has been addressed and significant improvements have been added to colorimetry by adding the capability to read ambient light (specifically that light that is impinging upon the image source) in real time and developing supporting algorithms to compensate for deleterious effects.

As noted above, prior art colorimeters measure ambient light by removing the colorimeter body from the image source screen, placing a diffuser on the viewing surface of the colorimeter, and orienting the combination away from the screen to get a reading estimate of the ambient light.

The present invention disclosed herein orients a rear facing ambient sensor on the main printed circuit board (PCB). The rear facing ambient sensor is capable of viewing the incoming ambient light while a set of forward facing color sensors simultaneously read the luminance emanating from the image screen. The ambient viewing path can be in the form of a chamber and orifice or can be fitted with a light-pipe, both means accomplish measurement of the ambient light in a manner that closely matches the incoming direction of most closely captures the effective characteristics of the ambient light. Alternatively, LEDs can be included to provide feedback information including but not limited to: 1) status such as when the colorimeter is calibrating, 2) when there has been a significant change in ambient light.

Figure 6:
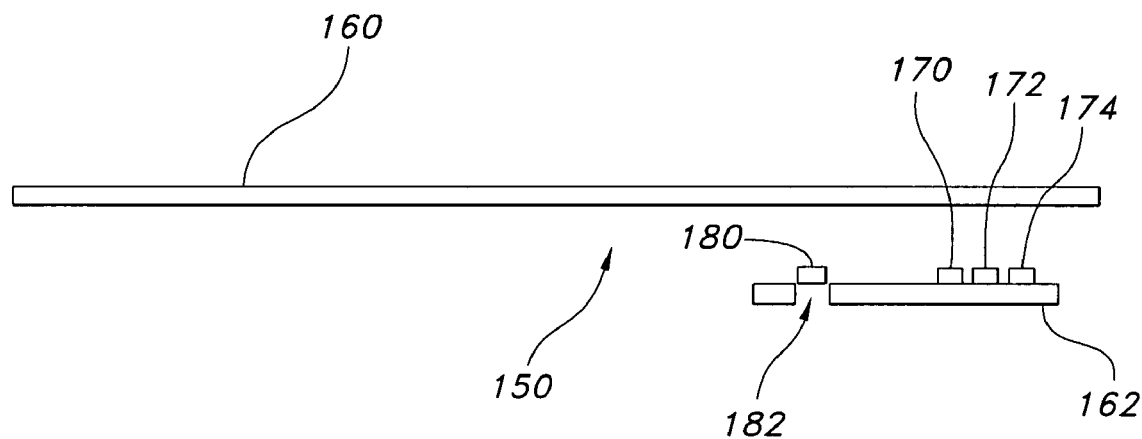
FIG. 6 is a simplified schematic diagram illustrating a calorimeter for simultaneously measuring ambient light illumination impinging on a source image and the attributes of the luminance emanating from the source image in accordance with the present disclosure.

FIG. 6 is a simplified schematic of a system 150 for simultaneously measuring ambient light illumination impinging on a source image 160 and the attributes of the luminance emanating from the source image 160. In the embodiment shown, source image 150 is an image displayed on a monitor. System 150 includes a primary calorimeter PCB 162 with sensors 170, 172, and 174 facing the source image 160 to make component readings of the luminance emanating from the source image 160. An ambient sensor 180 faces rearward viewing ambient light impinging on the surface of the source image 160. An aperture or chamber 182 allows passage of the ambient light to the associated rear-facing sensor 180 operably coupled to PCB 162.

Figure 7:
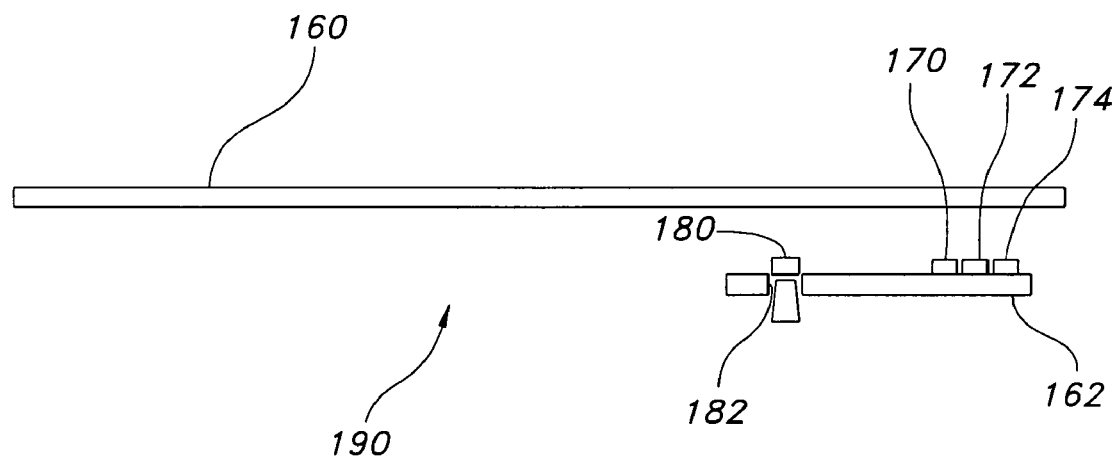
FIG. 7 is a simplified schematic diagram of another calorimeter for simultaneously measuring ambient light illumination impinging on the source image and the attributes of the luminance emanating from the source image having a light-pipe directing the ambient light to an associated rear-facing sensor.
Figure 8:
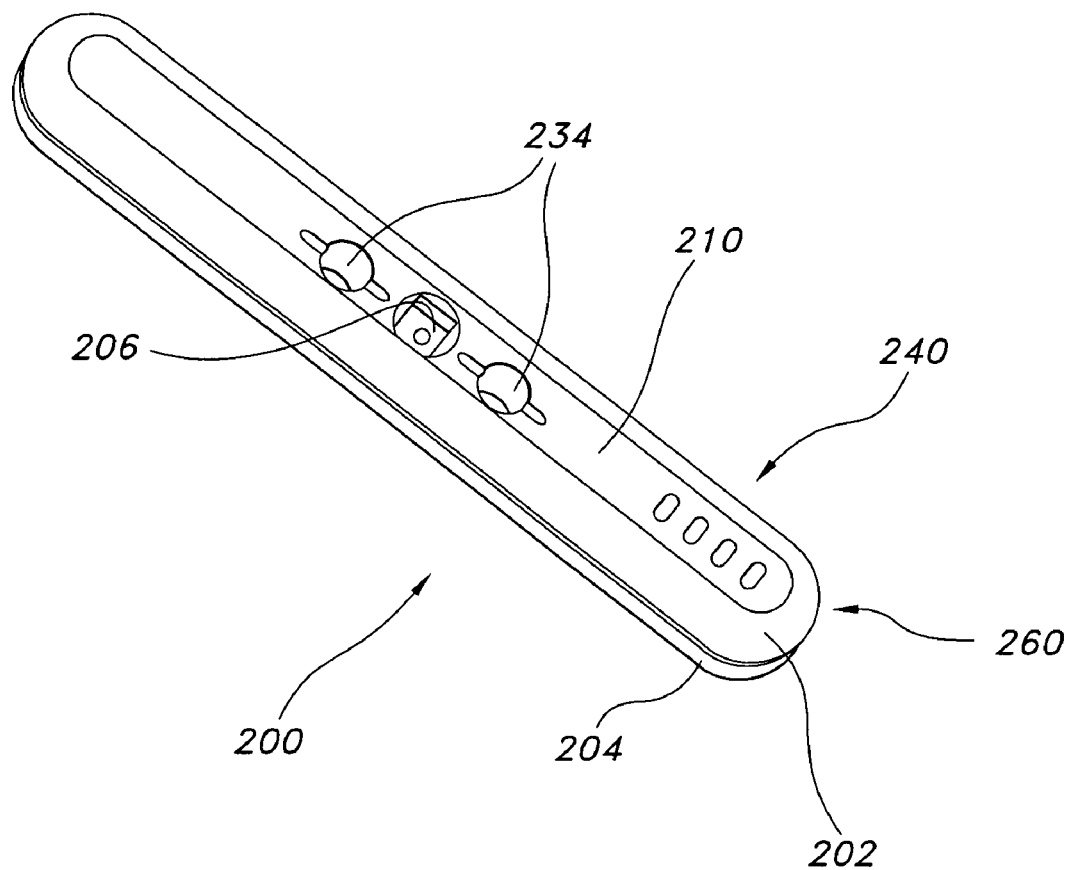
FIG. 8 is a front perspective view of a calorimeter similar to the colorimeter shown in FIG. 7 illustrating a plurality of light emitting diodes (LEDs) to indicate a status of the calorimeter to a user.

FIG. 7 is simplified schematic of a system 190 for simultaneously measuring ambient light illumination impinging on the source image 160 and the attributes of the luminance emanating from the source image 160 in accordance with an exemplary alternative embodiment. Just as in FIG. 6, the primary colorimeter PCB 162 is operably connected to the sensors 170, 172 and 174 facing the source image 160 to make component readings of the luminance emanating from the source image 160. In addition, the ambient sensor 180 faces rearward viewing ambient light impinging on the source image surface 160. A light pipe 194 is disposed within aperture 182 and directs the ambient light to the associated rear-facing sensor 180 operably coupled to the PCB 162.

Referring now to FIGS. 8-12, a calorimeter 200 embodying the elements described with respect to FIGS. 6 and 7 is illustrated. Colorimeter 200 includes a front cover 202 and a rear cover 204 housing components associated with colorimeter 200. The front cover 202 faces the impinging ambient light while the back cover 204 faces the source image (not shown). The front cover 202 is configured to receive a light pipe 210 for receiving the impinging ambient light. The light pipe 210 includes a lens 206 for directing impinging light to an ambient light sensor aligned therewith. A major portion of the light pipe 210 is shown having an exposed surface that is substantially flush with front cover 202, however, other suitable configurations are contemplated.

Figure 10:
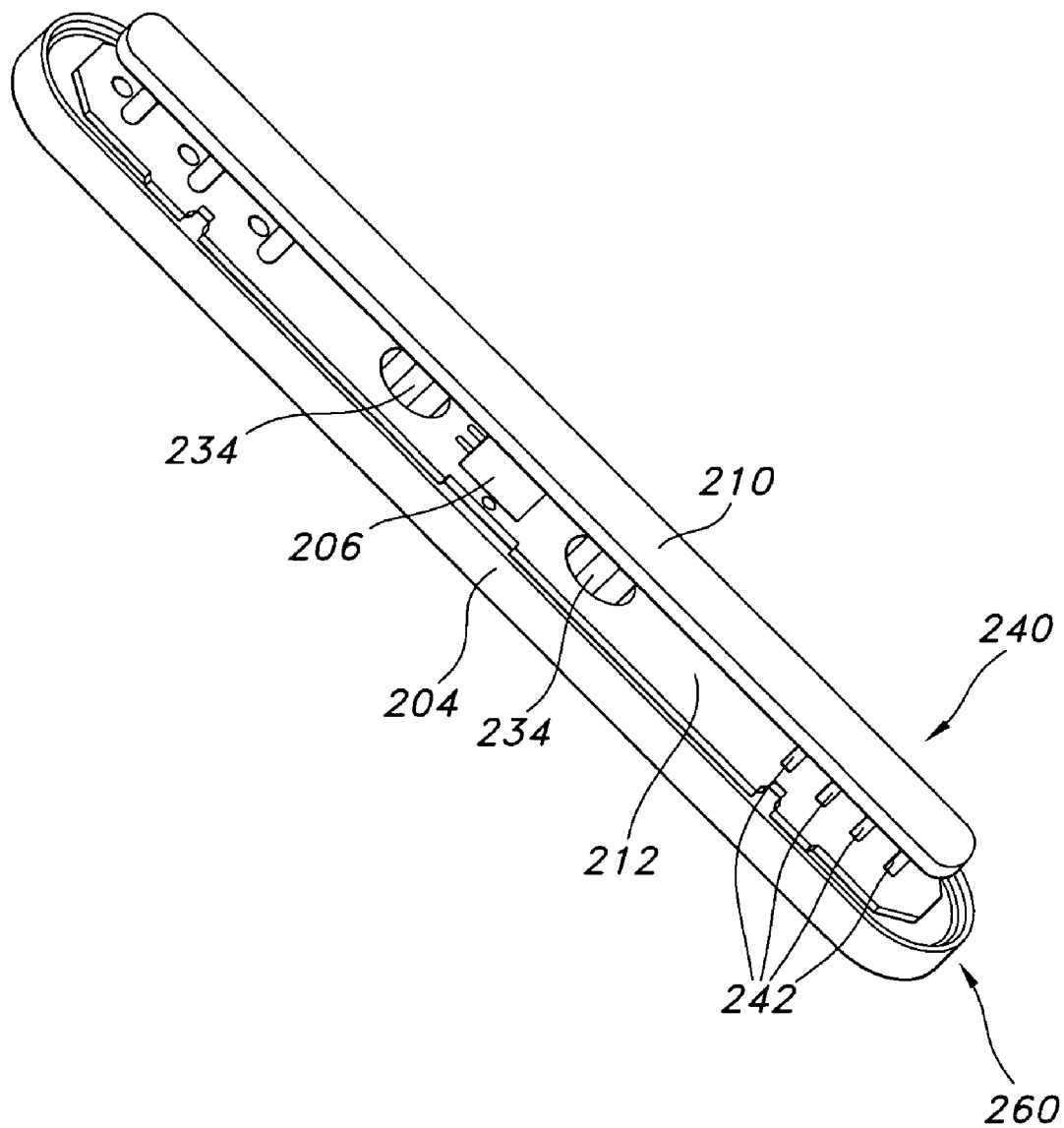
FIG. 10 is an exploded front perspective view of FIG. 8 illustrating a housing, PCB and light pipe of the colorimeter with a front cover removed.
Figure 11:
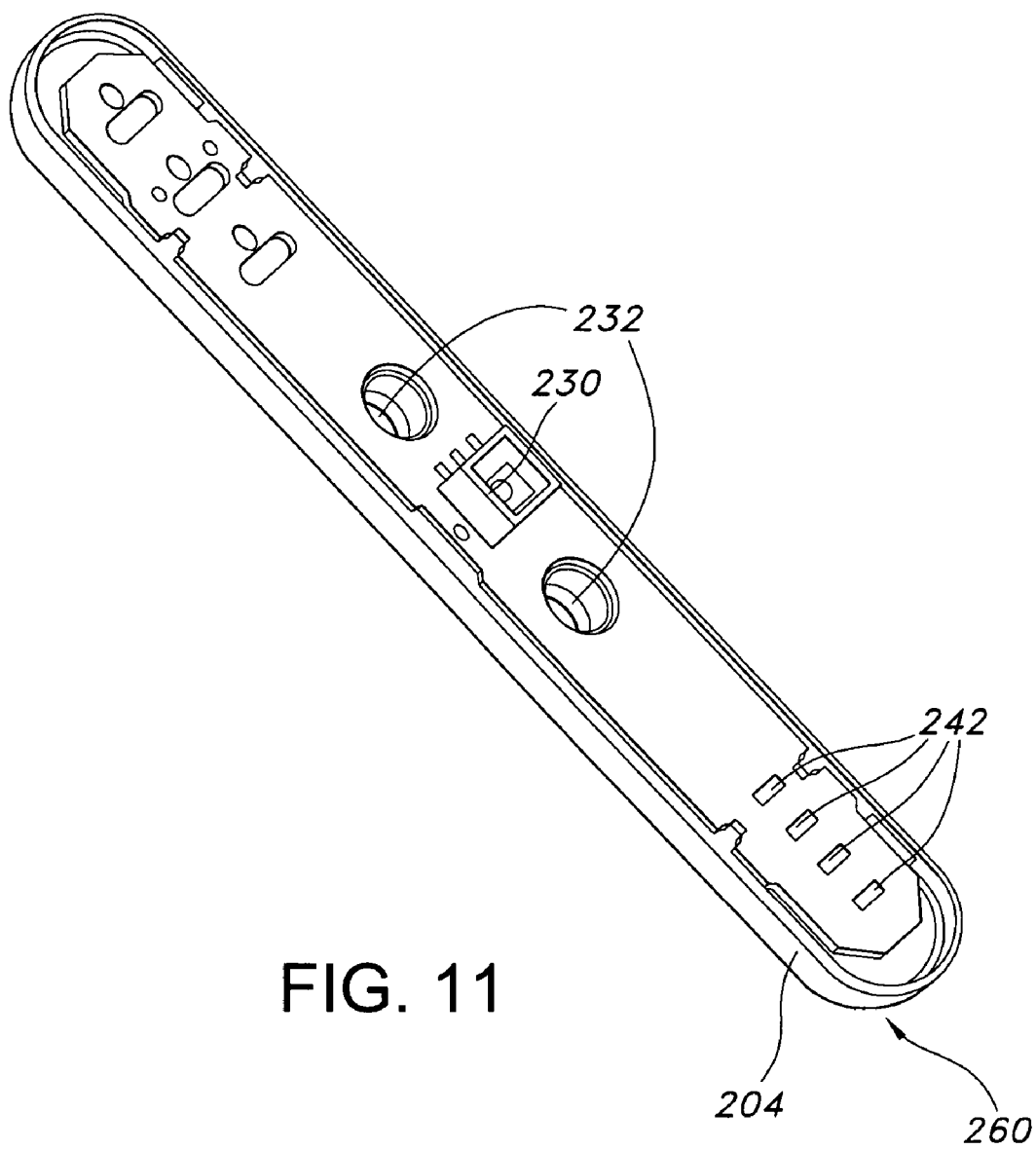
FIG. 11 is a front perspective view of the calorimeter of FIG. 10 with the light pipe and front cover removed.

The front and rear covers 202 and 204 enclose a PCB 212 disposed intermediate the light pipe 210 and rear cover 204 as best seen in FIG. 10. PCB 212 is a primary calorimeter PCB with sensors 220, 222, and 224 facing the source image (not shown) to make component readings of the luminance emanating from the source image. An ambient sensor 230 faces ambient light impinging on the surface of the source image. The ambient sensor 230 is a light tight package that receives the ambient light directed at the source image and impinging the lens 206 of light pipe 210. A pair of corresponding apertures 232 defined by PCB 212 allow corresponding light pipe cylinders 234 extending from light pipe 210 to extend therethrough to the rear cover 204. Each cylinder 234 is capped with a clear plastic lens 236 Each lens 236 and cylinder 234 allows passage of the light emitted from the source image to pass through the PCB 212 and direct the same to the ambient sensor 230 located on an opposite surface side of the PCB 212 where the three sensors 220, 222 and 224 are disposed.

A means to indicate the status of calorimeter 200 (e.g., calibration) or indicate a change in the ambient illumination may be disposed at an opposite end of the calorimeter from which the sensors 220, 222 and 224 are disposed. The indicating means 240 may include a plurality of LEDs or other display means known in the art to indicate a status or parameter. In an exemplary embodiment, four differently colored LEDs are indicated generally at 242. Depending on which of the differently colored LEDs are lit, one or more lit LEDs or a sequence thereof may indicate the status of calibration or re-calibration of colorimeter 200 and/or indicate that there has been a predetermined change in ambient illumination, for example. However, other parameters or status conditions may be indicated as well.

Figure 9:
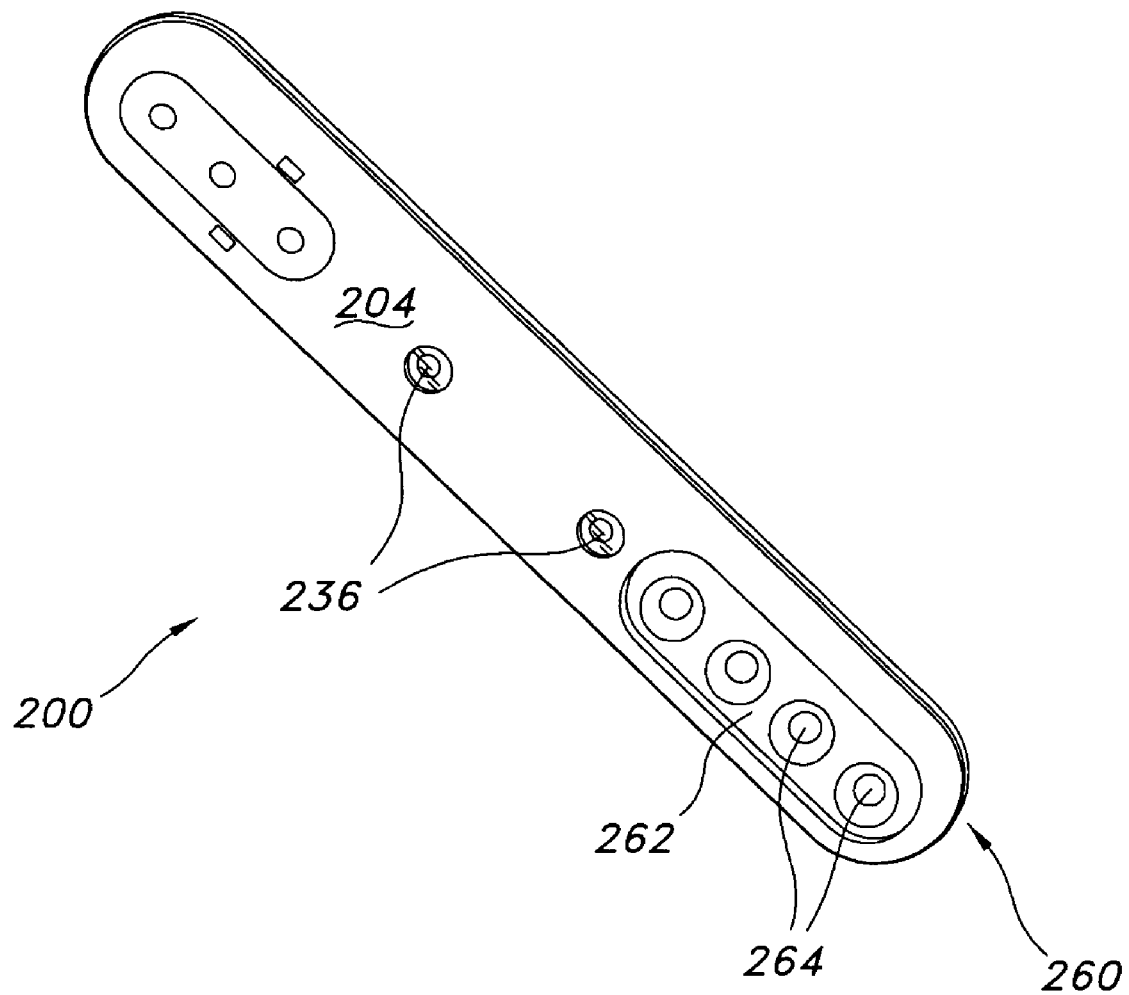
FIG. 9 is a rear perspective view of the colorimeter of FIG. 8 illustrating an external baffle with three apertures for receiving luminance emanating from the source image therethrough.
Figure 12:
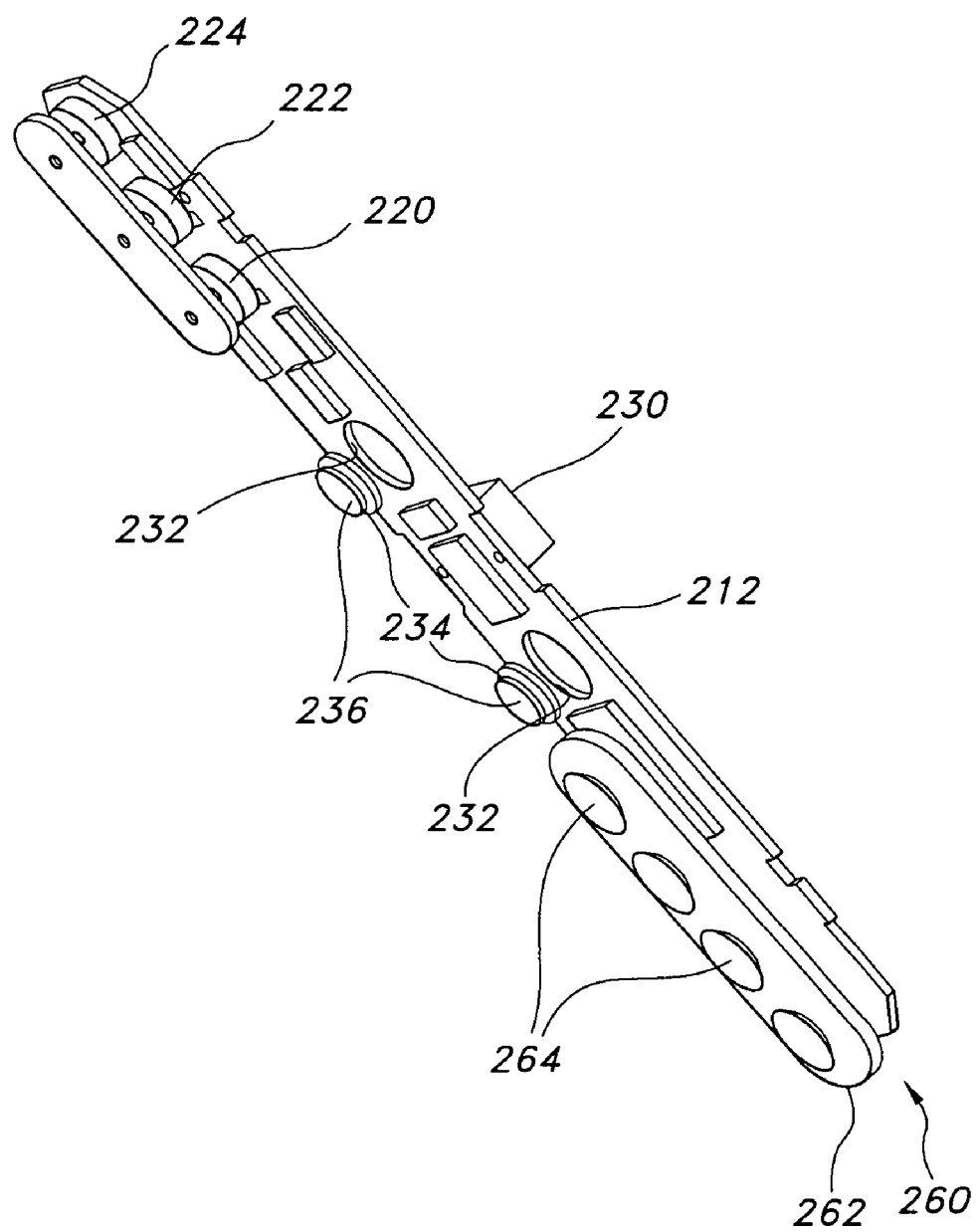
FIG. 12 is an exploded rear perspective view illustrating an orientation of sensors, chamber, orifices and PCB after removing front and rear covers and the light-pipe from the colorimeter shown in FIG. 11.

As best seen with reference to FIGS. 9 and 12, rear cover 204 is configured to receive an external baffle 250 having three apertures 252, 254 and 256 aligned with a respective sensor 220, 222 and 224. The external baffle 250 is illustrated as being substantially flush with a rear surface defining the rear cover 204, but other suitable configurations (e.g., recessed or raised from rear cover 204) are contemplated. The external baffle 250 further defines the field of view for sensors 220, 222 and 224. At an opposite end of the rear cover 204 indicated generally at 260, an attachment means 262 is exposed for attaching the calorimeter 200 to a display monitor (not shown). In an exemplary embodiment as depicted, the attachment means includes a plurality of suction cups (four shown) 264 for releasable attachment to the display surface of the monitor. As shown, the plurality of suction cups are serially aligned with respect to one another, however, other configurations are contemplated. Attachment means 262 may include any known releasable affixing device that allows the colorimeter to be attached to the image source without damage to the same.

Figure 13:
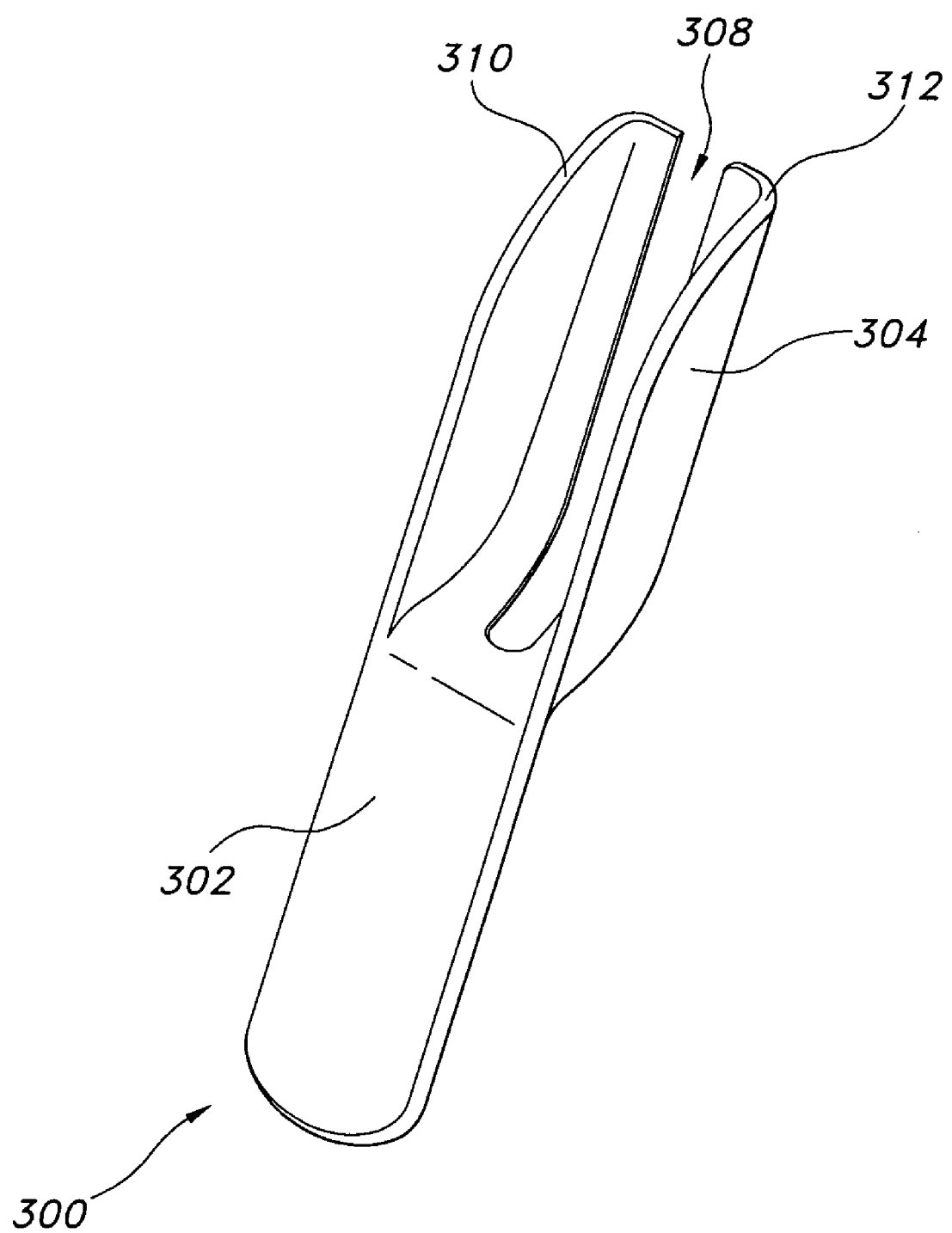
FIG. 13 is a front perspective view of a calorimeter housing that can be affixed to a monitor (other than on a display screen) to conveniently hold the colorimeter when not in use.
Figure 14:
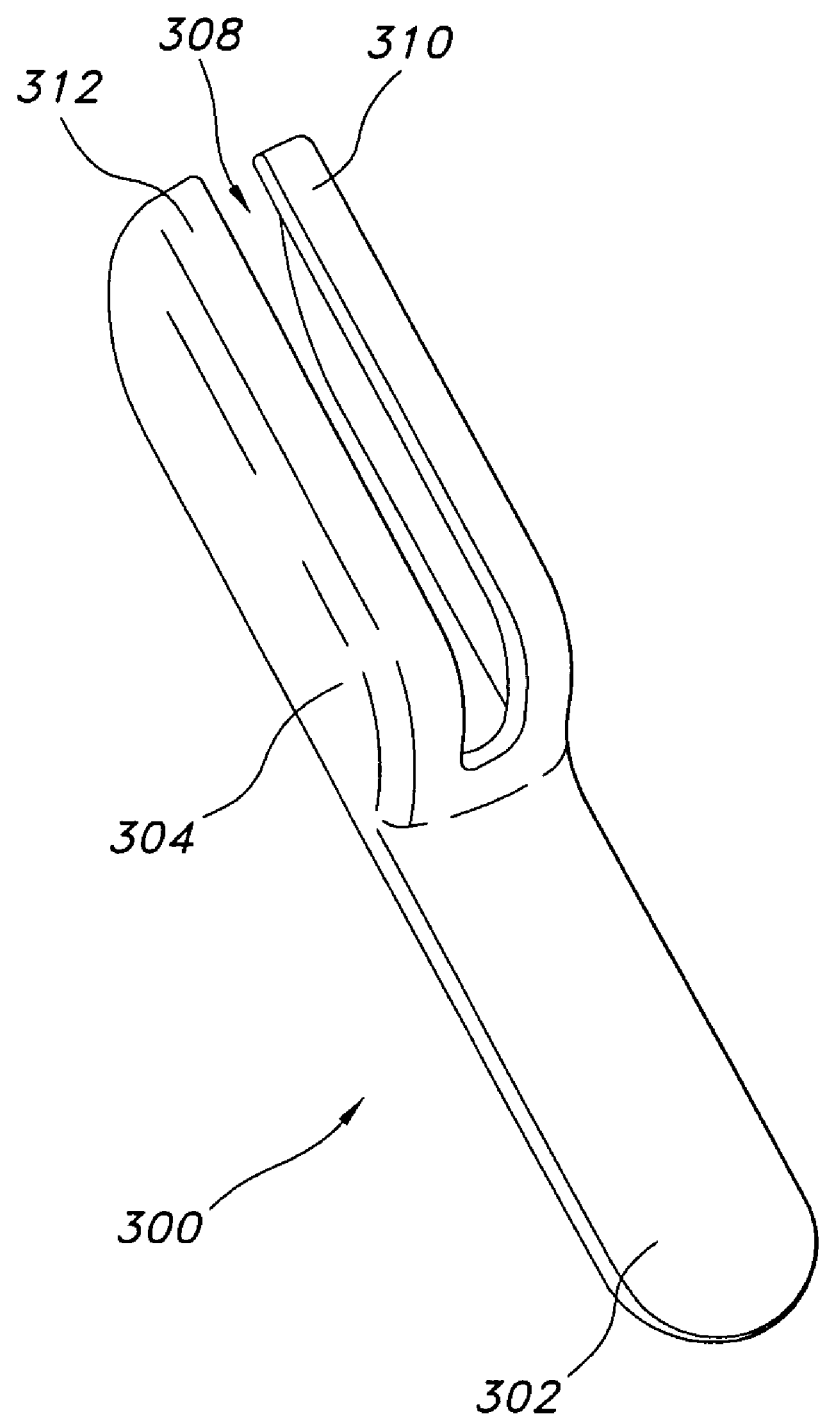
FIG. 14 is a rear perspective view of the calorimeter housing of FIG. 13.

Referring now to FIGS. 13 and 14, a housing 300 for holding the colorimeter of FIGS. 8-12 is illustrated. Housing 300 is configured to be affixable to the source image, for example a display monitor other than the display screen, when the calorimeter 200 is not in use. Housing 300 includes a first member 302 and a second member 304 extending from the first member 302. The first member 302 is substantially planar for providing a surface to be affixed to a monitor, for example. The second member 304 extending from the first member 302 is configured to receive at one of the two longitudinal ends defining the colorimeter 300. More specifically, second member 304 is contoured having a similar contour to the end 260 defined by the either the front or rear covers 202, 204, respectively. Further, the second member 304 includes a longitudinal groove 308 substantially bisecting the second member 304 into first and second portions 310 and 312, respectively. The first and second portions 310 and 312, respectively, then can be resiliently displaced relative to each other to releasably receive and secure the colorimeter 200 therewith when not in use. In addition, the plurality of serially aligned suction cups 264 disposed in the second member 304 may provide a tacky surface to provide releasable positive grip between the colorimeter 200 and housing 300.

Measuring the effects of ambient light impinging on a source image and correcting either statically, dynamically in real-time, or both provide significant further improvement to the ability of a calorimeter to provide optimum image processing. Among the relative few low cost implementations of calorimeters, an improved calorimeter results from the present invention discussed herein seamlessly integrated with prior work performed by the applicants. Prior work includes development of software, firmware, algorithms and circuits (largely presented in U.S. Pat. No. 5,892,585 and in U.S. Patent Publication No. 2004/0114144. The result is to provide a significant improvement in accuracy, repeatability and other factors of effective colorimetry.

While the invention has been described with respect to specific exemplary embodiments set forth herein, those skilled in the art will readily appreciate that various modifications, changes, and enhancements may be made thereto without departing from the spirit or scope of the present invention. The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A color sensing device for sensing light emitting from a target surface, the device comprising:
   a chamber block having at least three overlapping spectral light passages extending through the chamber block configured to select a preferred field of view between the target surface and a corresponding sensor adapted to detect light from the target surface, each light passage comprising:
   an entry orifice facing the target surface, the entry orifice defined with an entry wall defining an entrance for emitted light from the target surface into the light passage;
   an exit orifice facing the sensor, the exit orifice defined with an exit wall defining an exit for the emitted light from the light passage; and
   a chamber intermediate the entry and exits walls, the chamber defined by a chamber wall having a diameter larger than a diameter of the entry and exit walls.

2. The color sensing device of claim 1, wherein at least one of the entry and exit walls forms a frustoconical orifice.

3. The color sensing device of claim 2 wherein the entry orifice is defined with an entry opening to the chamber block having a diameter smaller than a first opening to the chamber.

4. The color sensing device of claim 2, wherein the exit orifice is defined with an exit opening to the chamber block having a diameter larger than a second opening to the chamber.

5. The color sensing device of claim 2, wherein the entry orifice is defined with an entry opening to the chamber block having a diameter smaller than a first opening to the chamber and the exit orifice is defined with an exit opening to the chamber block having a diameter larger than a second opening to the chamber, the first and second openings defining opposite openings of the chamber connected to the entry and exit walls, respectively.

6. The color sensing device of claim 5, wherein a diameter of the entry opening to the block is smaller than a diameter of the exit opening to the block.

7. The color sensing device of claim 1, wherein the chamber wall is cylindrical.

8. The color sensing device of claim 1, wherein the chamber block is a two part separable chamber block.

9. The color sensing device of claim 1, further comprising a baffle having an aperture aligned with one of the light passages of the block, the baffle being disposed at least at one of inside the chamber and outside the chamber in proximity of the entry or exit orifices to eliminate or minimize extraneous light rays that might reach the sensor and degrade the signal-to-noise ratio.

10. The color sensing device of claim 9, wherein the baffle is disposed outside the block and spaced from a respective corresponding entry or exit orifice.

11. The color sensing device of claim 9, wherein the baffle disposed inside the chamber defines the aperture thereof by countersinking opposite surfaces defining the baffle.

12. A color sensing device for sensing light emitting from a target surface, the device comprising:
    three or more light sensors, each sensor configured to detect light from the target surface;
    a sensor locating element having three or more light passages and corresponding alignment features, each alignment feature adapted to receive a locating feature of a corresponding sensor, thereby aligning each sensor with a corresponding light passage;
    a chamber block operatively coupled in alignment with the sensor locating element, the chamber block having three or more filter cavities and corresponding light passages, each light passage in alignment with a corresponding light passage of the sensor locating element, each light passage comprising:
    an entry orifice facing the target surface, the entry orifice defined with an entry wall defining an entrance for emitted light from the target surface into the light passage;
    an exit orifice facing the sensor, the exit orifice defined with an exit wall defining an exit for the emitted light from the light passage; and
    a chamber intermediate the entry and exits walls, the chamber defined by a chamber wall having a diameter larger than a diameter of the entry and exit walls; and
    three or more distinct light filter stacks including one or more filter elements, each filter stack placed in a corresponding one of the filter cavities, thereby providing three or more overlapping spectrally selective channels, with each spectrally selective channel designed to provide a pre-defined field of view between the target surface and a corresponding one of the light sensors.

13. The color sensing device of claim 12, wherein each spectrally selective channel is designed to provide a field of view between each sensor and the target surface in the range of +/−5 to 7 degrees of included angle along a center line optical path from a center of the sensor lens to a central ray emanating from the target surface.

14. The color sensing device of claim 12, further comprising a baffle having an aperture aligned with the light passage of the block, the baffle being disposed at least at one of inside the chamber and outside the chamber in proximity of the entry or exit orifices to eliminate or minimize extraneous light rays that might reach the sensor and degrade the signal-to-noise ratio.

15. The color sensing device of claim 12, wherein the target surface includes one of a LCD display, illuminated printed or graphic matter, and temporally active types including a CRT display or flat panel display.

16. A color sensing device for sensing light emitting from a target surface, the device comprising:
    a first housing;
    three or more light sensors disposed with the first housing and facing the target surface;
    a chamber block having at least three overlapping spectral light passages extending through the chamber block configured to select a preferred field of view between the target surface and a corresponding right sensor adapted to detect light from the target surface; and an ambient light sensor disposed so as to be with or within the first housing facing ambient light impinging the target surface without the need to reorient the first housing relative to the target surface, wherein the ambient sensor continuously reads the impinging light while the three or more light sensors simultaneously read the light attributes emanating from the target surface.

17. The color sensing device of claim 16, wherein the ambient light sensor faces an the impinging ambient light and the three or more light sensors face the target image allowing for simultaneous reading of the target image attributes and the impinging ambient light with the first housing is in a fixed position relative to the target image.

18. The color sensing device of claim 16, further comprising a feedback means for providing feedback to a user indicative of when re-calibration or other operation is being performed by the color sensing device or when there is a predetermined change in measurement of the impinging ambient light.

19. The color sensing device of claim 18, wherein the feedback means includes one or more LEDs disposed at the first housing visible to the user.

20. The color sensing device of claim 19, wherein different LED colors are used to provide additional content of the feedback.

21. The color sensing device of claim 16, wherein the first housing includes an optical path that captures a true nature and direction of the ambient light impinging on the source image and directs the same to the ambient light sensor.

22. The color sensing device of claim 21, wherein the optical path includes a light pipe element configured to capture the impinging ambient light and provide the same to the ambient light sensor.

23. The color sensing device of claim 16, further comprising a second housing, the second housing affixable to a display device and configured to releasably receive the first housing when the device is not being used.

* * * * *